Jan. 15, 1952  M. JEZEWSKI ET AL  2,582,437
ELECTROMAGNETIC TESTING DEVICE FOR STEEL ROPES
Filed May 8, 1948

INVENTORS.
MIECZYSLAW JEZEWSKI
LUDGER SZKLARSKI
BY
ATTORNEY.

Patented Jan. 15, 1952

2,582,437

UNITED STATES PATENT OFFICE 2,582,437

ELECTROMAGNETIC TESTING DEVICE FOR STEEL ROPES

Mieczyslaw Jezewski and Ludger Szklarski, Krakow, Poland, assignors to Maurycy Brokman, New York, N. Y., and Waclaw Szukiewicz, Forest Hills, N. Y.

Application May 8, 1948, Serial No. 25,906
In Poland May 10, 1947

7 Claims. (Cl. 175—183)

1

This invention relates to apparatus for supervising the condition of ferro-magnetic ropes, such as steel ropes used in the mining industry. More specifically, the invention relates to a detector device for actuating the indicating means of such apparatus.

The invention is particularly concerned with the detection of broken wires and similar faults such as corrosion and abrasions affecting the cross-section of the rope.

One of the objects of the present invention is to provide detector device of the general type, above referred to, which permits to detect accurately and rapidly the presence and location of defective rope spots and sections.

Another object of the invention is to provide a detector device which permits to limit the indications of the indicating means to defects exceeding a selected minimum.

Another object of the invention is to provide a detector device which is indicative of the approximate magnitude of a detected defect.

Another object of the invention is to provide a detector device which eliminates the effect of oscillations of the rope and minor variations of the rope material upon the indications of the indicating means.

Another object of the invention is to provide a detector device which compensates for varying velocities of the rope thereby assuring a uniform indication for a given magnitude of a rope defect.

Other and further objects, features and advantages of the invention will be pointed out hereinafter and set forth in the appended claims forming part of the application.

In the accompanying drawing a now preferred embodiment of the invention is shown by way of illustration and not by way of limitation.

Figure 1:
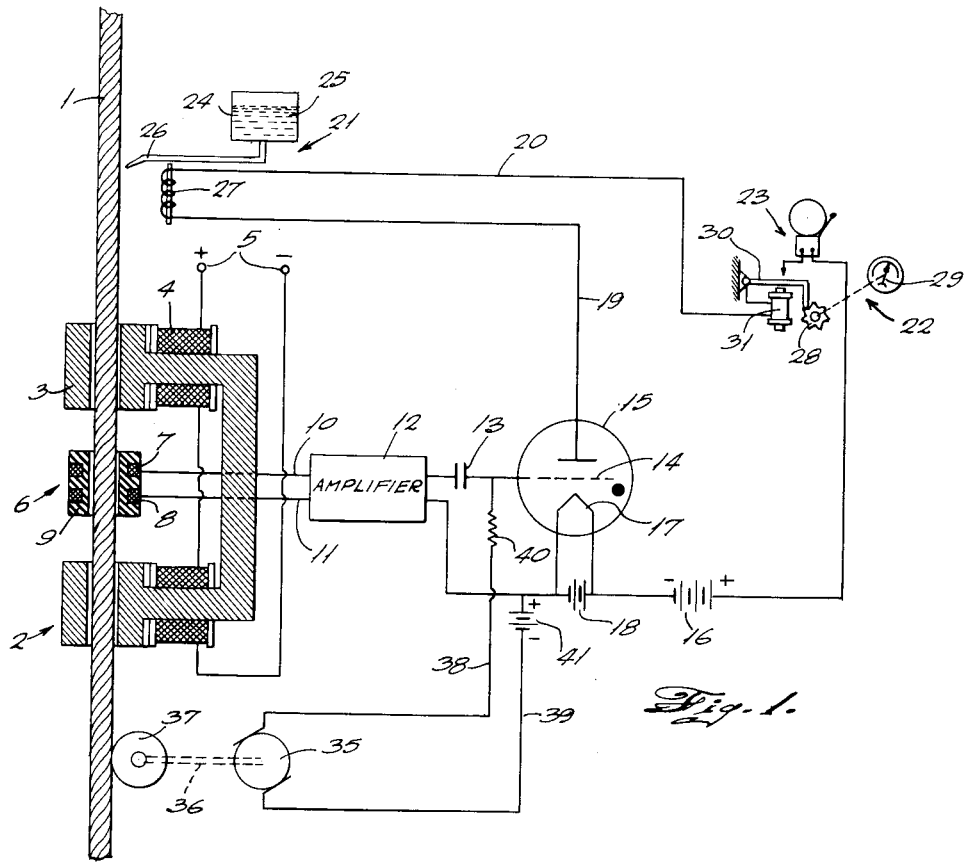
Fig. 1 is a typical diagrammatic circuit arrangement of an indicator with a detector device according to the invention for supervising a ferromagnetic rope.
Figures 2, 3:
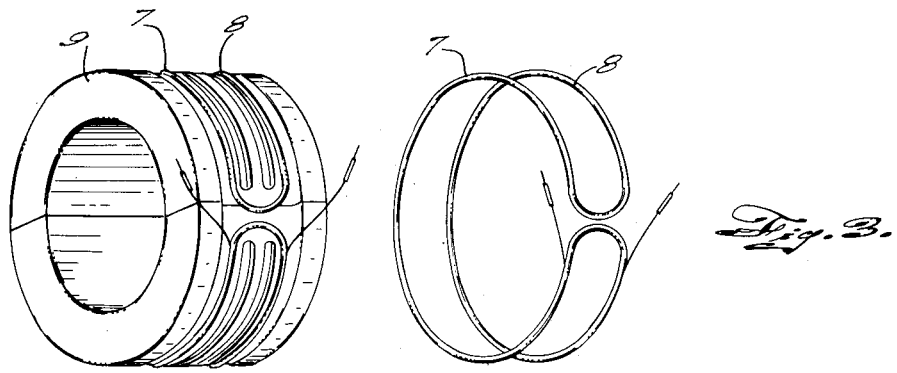
Fig. 2 is a perspective view of the detecting solenoid means of the detector device.
Fig. 3 is a perspective view of the coils of the solenoid means.

Referring now to the figures in detail, Fig. 1 shows a section of a ferro-magnetic rope 1 which should be visualized as being in motion relative to the detector device. Generally, it may be assumed that the rope is moving and the detector device is stationary. As previously mentioned, the purpose of the detector device is to detect any

2 changes in the condition of the rope, such as caused by broken wires, corrosion and abrasions, reducing the useful cross-section of the rope.

The detector device proper comprises electromagnetic means, generally designated by 2, having a core 3 encompassing the rope and disposed coaxially therewith. The coils 4 of the electromagnetic means are energized from a suitable D.-C. source 5. As will be noted, core 3 is U-shaped and each shank of the core mounts a coil which coils are connected in series. The electromagnetic means 2 serve to magnetize successive rope sections passing through the core. The magnetic field of each magnetized rope section is controlled by its mechanical condition.

The magnetic field thus produced is continually probed by a solenoid, generally designated by 6. This solenoid detector comprises a pair of coils 7 and 8 mounted on insulating material 9 shown as a wooden drum. The two coils are mounted coaxially with the rope axis and wound in opposition. The E. M. F. output of the coils is adjusted for zero output in response to the magnetic field of a moving magnetized rope section in a selected condition, generally in a flawless condition. The number of the coil turns of coils 7 and 8 should, of course, be selected according to the desired sensitivity of the detector device.

The detecting solenoid is connected by leads 10 and 11 to an amplifier 12 of conventional design. The output side of the amplifier is connected through a capacitor 13 with the control grid 14 of electronic tube means here shown as a gas filled thyratron tube 15 the plate circuit of which is connected with a D.-C. source 16 shown as a battery. The grid of the tube is connected with a battery 41 so that a fixed negative bias is impressed by battery 41 upon the grid. The purpose of this negative bias will be more fully explained hereinafter. The cathode 17 is directly heated and connected for this purpose with a battery 18. The plate circuit of the tube is connected by leads 19 and 20 with the indicating means of the installation. These indicating means may be arranged in any suitable manner. There are shown a marking or recording device generally designated by 21; an indicator generally designated by 22; and a bell generally designated by 23.

The marking device 21 comprises a receptacle 24 containing a supply of liquid 25 and communicating with a pipe 26. The outlet end of this pipe serves to mark a spot on rope 1 when a solenoid coil 27 in the plate circuit is energized.

Indicator 22 is shown as comprising a rotatable star wheel 28 moving a hand 29 step by step when rotated by the attraction of an armature 30 in response to an energization of a solenoid coil 31 also included in the plate circuit. Armature 30 also serves as connection for the coil of the bell 23 which can be intermittently connected by vibrations of armature 30.

The installation further comprises a D.-C. generator 35 the rotor of which is connected by a linkage 36 with a roller 37 in frictional engagement with the rope so that the rotor of the generator is rotated with a speed corresponding to the velocity of rope 1. The output of generator 35 is supplied by leads 38 and 39 and through a resistor 40 to the grid 14.

The connection of the generator output with the grid is so that the negative bias impressed by battery 41 upon the grid is continually and accurately varied corresponding to the velocity of the rope and increases with the rope velocity.

As was previously mentioned, the E. M. F. of detector 6 is adjusted for zero output when the rope is in a selected, generally a substantially flawless condition. If now one or more wires of the rope are broken, thereby reducing the useful cross-section of the rope, the balance of coils 7 and 8 is upset and signals are supplied through amplifier 12 to the tube 15. As a result, the plate current of this tube begins to flow and actuates the various signal means in the plate circuit. Consequently, coil 27 will attract recording pipe 26 for marking a spot on rope 1, indicator 22 will be moved one or more steps and bell 23 will ring. It will be apparent that by varying the fixed negative bias of grid 14 and the number of windings of coils 7 and 8 the sensitivity of the device can be adjusted so that the plate current can flow only above a certain threshold value of the defect. Furthermore, the approximate magnitude of the defect can be determined by manipulating the sensitivity of the device.

It will be apparent that the signals supplied by detector 6 to the amplifier are also controlled by vibrations of the rope, unevenness of the rope cross-section and also by variations in the rope material. These last mentioned factors will produce weak signals. There is generally no need to detect and indicate such weak signals. The aforementioned fixed negative bias of grid 14 automatically prevents response of the signal means when the signals and, hence, the change in the E. M. F. output are below a selected minimum. In other words, the indicating means will indicate only changes in the E. M. F. output above a certain minimal value.

It will finally be obvious that the effect upon the E. M. F. output due to a given change in the cross-section of the rope will vary with the velocity of the rope. The higher the rope velocity is the greater will be the effect of a given change in cross-section. As a result, insignificant defects of the rope will be indicated when the rope is moving very fast. The aforementioned control of the negative bias of grid 14 by generator 37 compensates for variations of the rope velocity by adding to the negative bias impressed by battery 41 in proportion with the rope velocity so that a given rope defect will always have the same effect upon the E. M. F. output.

While the invention has been described in detail with respect to a certain now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. A D.-C. operated detector device for an electric indicator for supervising a ferro-magnetic rope in motion as to mechanical defects, comprising electronic tube means including a negatively biased control grid, the plate current of the tube means controlling the indications of said indicator, D.-C. energized electromagnetic means for magnetizing a rope portion moving adjacent to the electromagnetic means, the magnetic field of a magnetized rope portion being controlled by the mechanical condition of the respective rope portion, detecting solenoid means including a pair of oppositely wound coils disposed substantially coaxially with the rope axis, the E. M. F. output of said coils being adjusted for zero output in response to the magnetic field of a moving magnetized rope portion in normal mechanical condition, amplifying means connected in circuit with said solenoid coils and said control grid for transmitting the coil E. M. F. to said grid so as to reduce the negative grid bias in response to an increase of the coil output by reason of a variation of said magnetic field due to a rope defect, and D.-C. current generating means including a rotor operatively connected with the rope for rotation corresponding to the rope velocity, the output side of said generating means being connected in circuit with said control grid for increasing the negative bias thereof with increasing rope velocity, thereby controlling the plate current by a grid bias representing a function of the mechanical condition of the rope and the velocity thereof.

2. A detector device as described in claim 1, wherein said electronic tube means comprise a thyratron.

3. A detector device as described in claim 1, wherein the rotor of said current generating means is in frictional engagement with said rope for controlling the rotor rotations by the velocity of the rope.

4. A detector device as described in claim 1, in combination with an electromagnetically operated marking device included in the plate circuit of said electronic tube means and arranged to be actuated by a flow of plate current, said marking device being positioned relative to the rope so as to mark the same upon an actuation.

5. A detector device as described in claim 1, in combination with a relay included in the plate circuit of said electronic tube means for energization by a flow of plate current, and signal means connected in circuit with the relay for actuation of the signal means in response to an energization of the relay.

6. A detector device as described in claim 1, in combination with a relay included in the plate circuit of said electronic tube means for energization by a flow of plate current, recording signal means connected in circuit with the relay for actuation of the signal means in response to an energization of the relay, and switch means connected in series with and controlled by the relay, said switch means being arranged to interrupt the plate circuit in response to each energization of the relay.

7. A detector device for an electric indicator for supervising the condition of a ferro-magnetic rope in motion relative to said detector device, the said device comprising electronic tube means including a negatively biased control grid, the plate current of the tube means controlling the indications of said indicator, D.-C. energized electromagnetic means for successively magnetizing rope sections moving relative to the electromagnetic means adjacent thereto, the magnetic field of a magnetized rope section being controlled by the condition of the respective rope section, detecting solenoid means including oppositely wound coil portions disposed within the magnetic field of a magnetized rope section, the E. M. F. output of said solenoid means being adjusted for zero output in response to the magnetic field of a relatively moving magnetized rope section in a predetermined condition, amplifying means connected in circuit with said solenoid coils and said control grid for transmitting the said E. M. F. to said grid so as to reduce the negative grid bias in response to an increase of the coil output by reason of a variation of said magnetic field due to a rope defect, and D.-C. current generating means including a rotor operatively connected with the rope for rotation corresponding to the rope velocity, the output side of said generating means being connected in circuit with said control grid for increasing the negative bias thereof with increasing rope velocity, thereby controlling the plate current by a grid bias representing a function of the condition of the rope and the velocity thereof.

MIECZYSLAW JEZEWSKI.
LUDGER SZKLARSKI.

REFERENCES CITED

The following references are of record in the file of this patent:

UNITED STATES PATENTS

| Number | Name | Date |
|---|---|---|
| 1,823,810 | Wall | Sept. 15, 1931 |
| 2,102,452 | Zuschlag | Dec. 14, 1937 |
| 2,264,873 | Cockrell | Dec. 2, 1941 |
| 2,315,045 | Breitenstein | Mar. 30, 1943 |

OTHER REFERENCES

General Electric Review, vol. 32, No. 7, July 1929, page 397.